(12) United States Patent
Kikumoto et al.

(10) Patent No.: US 12,348,683 B2
(45) Date of Patent: Jul. 1, 2025

(54) PRINTED-MATTER INSPECTION SYSTEM, COMPUTER PRODUCT, AND METHOD FOR DISPLAYING DUMMY PAGE FOR SCANNED IMAGE OF TARGET

(71) Applicant: FUJIFILM Business Innovation Corp., Tokyo (JP)

(72) Inventors: Takashi Kikumoto, Yokohama (JP); Yoshie Ohira, Yokohama (JP); Shogo Ishikawa, Yokohama (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 244 days.

(21) Appl. No.: 17/883,069

(22) Filed: Aug. 8, 2022

(65) Prior Publication Data
US 2023/0269333 A1 Aug. 24, 2023

(30) Foreign Application Priority Data
Feb. 24, 2022 (JP) .................. 2022-026502

(51) Int. Cl.
*H04N 1/00* (2006.01)

(52) U.S. Cl.
CPC ..... *H04N 1/00015* (2013.01); *H04N 1/00023* (2013.01); *H04N 1/00034* (2013.01);
(Continued)

(58) Field of Classification Search
CPC .......... H04N 1/00015; H04N 1/00023; H04N 1/00034; H04N 1/00042; H04N 1/00045; H04N 1/00047; H04N 1/00076; H04N 1/00092; H04N 1/0044; H04N 1/00442; H04N 1/00461; H04N 1/00477;
(Continued)

(56) References Cited

U.S. PATENT DOCUMENTS 11,159,688 B2   10/2021   Kurohata
11,277,530 B2   3/2022    Kurohata
(Continued)

FOREIGN PATENT DOCUMENTS

| JP | 2020-120160 A | 8/2020 |
| JP | 2020-172028 A | 10/2020 |
| JP | 2021-078083 A | 5/2021 |

OTHER PUBLICATIONS

Nov. 28, 2022 Extended European Search Report Issued in European Patent Application No. 22193053.0.

*Primary Examiner* — Scott A Rogers
(74) *Attorney, Agent, or Firm* — Oliff PLC

(57) ABSTRACT

A printed-matter inspection system includes a processor for evaluating quality of printed matter, and a display apparatus. The processor is configured, by reading a program for execution, to: for each of multiple pages in a job, if the page is an inspection target, compare, for inspection, a scanned image with a reference image, the scanned image being obtained through scanning of printed matter in the page, the reference image being generated by using rasterized data for the page; and, in display of the result of the inspection on the display apparatus, display the scanned image for the page that is an inspection target, and display, for a page that is not an inspection target, a dummy page and information indicating that the page is not an inspection target, the dummy page being a substitute of the scanned image.

20 Claims, 11 Drawing Sheets

(52) U.S. Cl.
CPC ..... *H04N 1/00045* (2013.01); *H04N 1/00076* (2013.01); *H04N 1/00442* (2013.01); *H04N 1/00461* (2013.01)

(58) Field of Classification Search
CPC ..... G06T 7/0002; G06T 7/0004; G06T 7/001; G06T 2207/10004; G06T 2207/10008; G06T 2207/10024; G06T 2207/20224; G06T 2207/20228; G06T 2207/30108; G06T 2207/30144; G06T 2207/30168; G06T 2207/30176
See application file for complete search history.

(56) References Cited

U.S. PATENT DOCUMENTS

| | | | |
|---|---|---|---|
| 11,829,656 B2* | 11/2023 | Kashiwagi | G06F 3/1253 |
| 2011/0149331 A1 | 6/2011 | Duggan et al. | |
| 2016/0050330 A1* | 2/2016 | Yamaneki | H04N 1/00824 358/1.13 |
| 2020/0233618 A1 | 7/2020 | Ayukawa | |
| 2020/0234421 A1* | 7/2020 | Kaminaka | G06F 3/1204 |
| 2020/0322492 A1 | 10/2020 | Kurohata | |
| 2022/0014637 A1 | 1/2022 | Kurohata | |
| 2022/0141346 A1 | 5/2022 | Kurohata | |

* cited by examiner

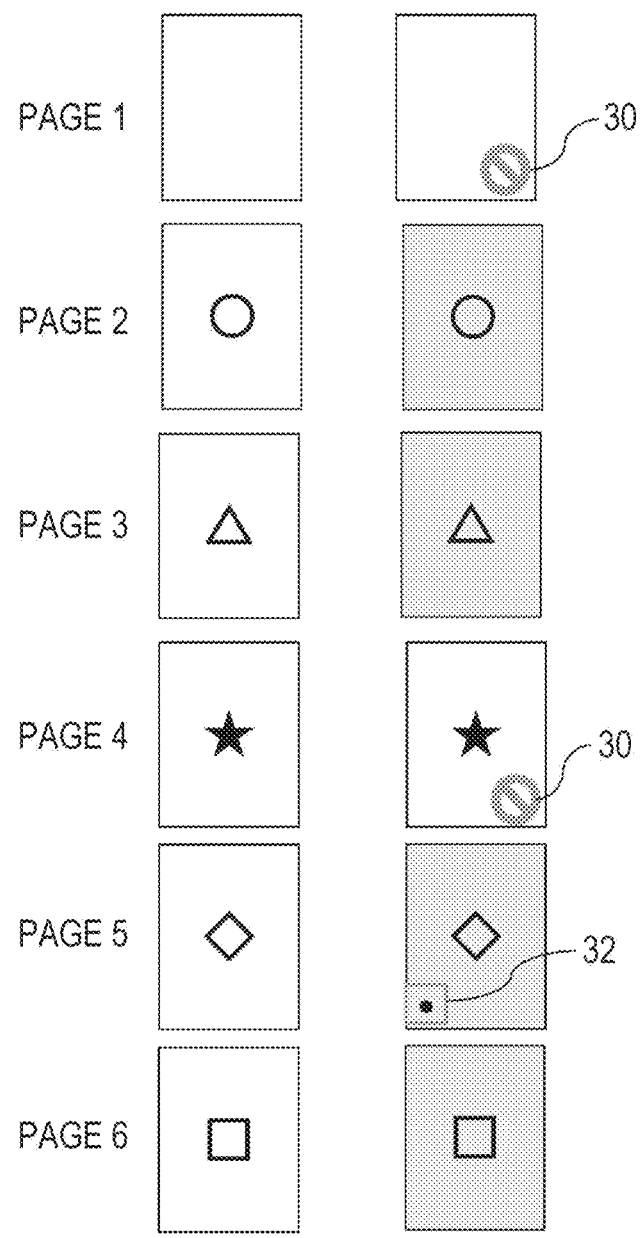

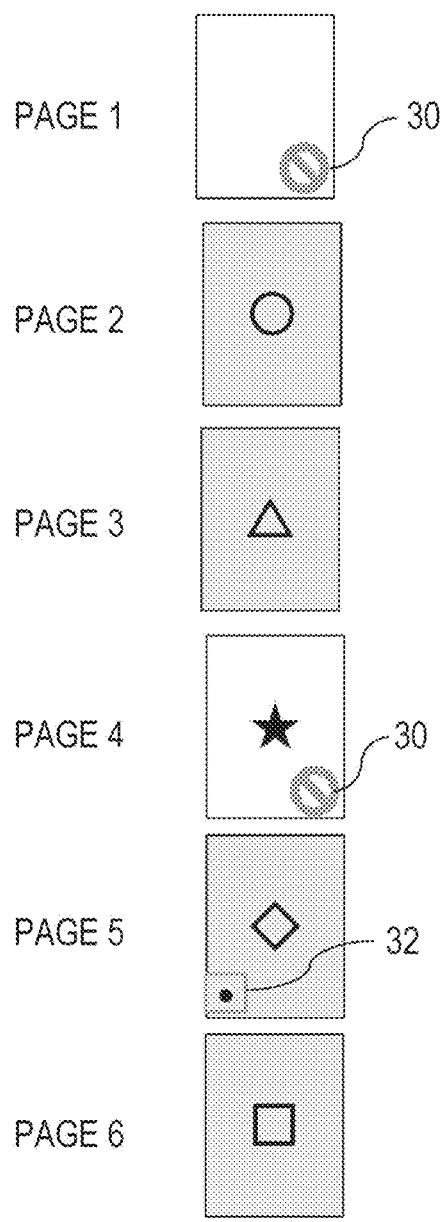

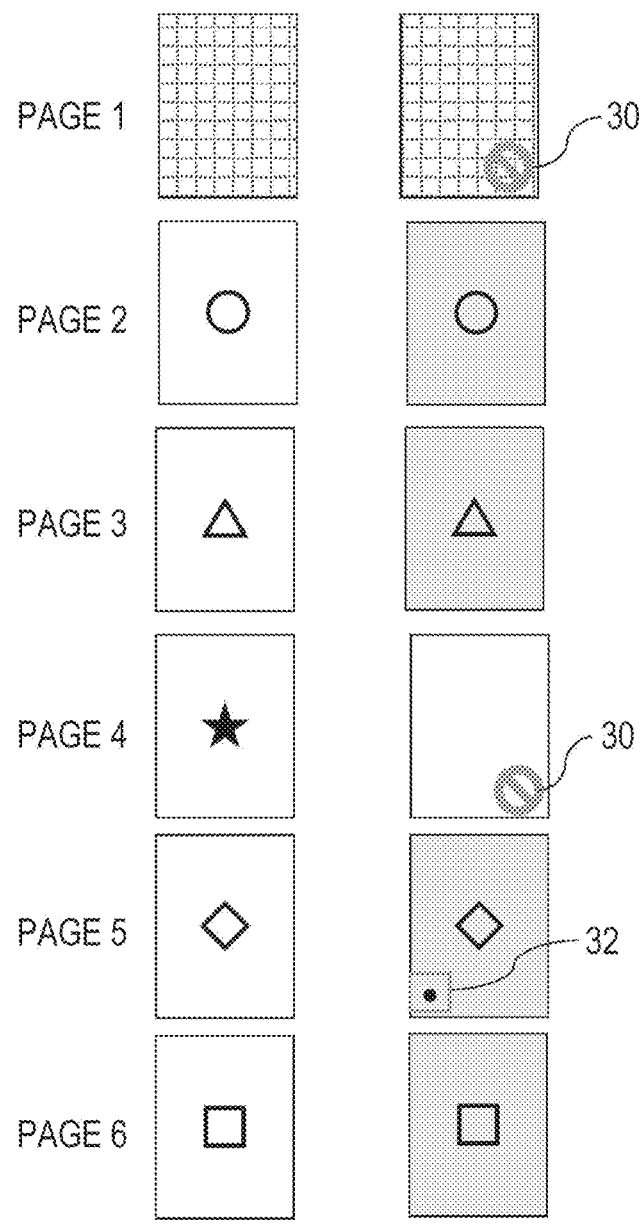

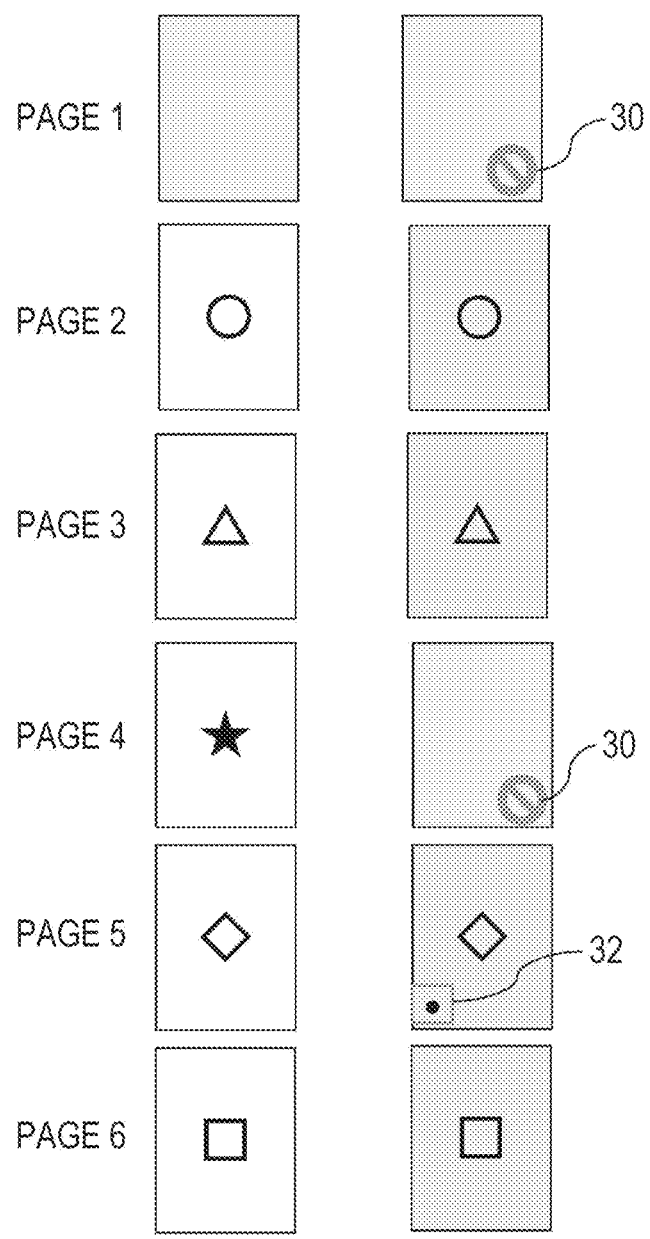

PRINTED-MATTER INSPECTION SYSTEM, COMPUTER PRODUCT, AND METHOD FOR DISPLAYING DUMMY PAGE FOR SCANNED IMAGE OF TARGET

CROSS-REFERENCE TO RELATED APPLICATIONS

This application is based on and claims priority under 35 USC 119 from Japanese Patent Application No. 2022-026502 filed Feb. 24, 2022.

BACKGROUND

(i) Technical Field

The present disclosure relates to a printed-matter inspection system, a non-transitory computer readable medium, and a printed-matter inspection method.

(ii) Related Art

Japanese Unexamined Patent Application Publication No. 2021-78083 describes an information processing apparatus which enables inspection of both sides of a sheet even when an image is printed only on a single side of the sheet. The information processing apparatus evaluates the print grade of printed matter on the basis of comparison between scanned images, which are obtained through scanning of the printed matter, and reference images. The information processing apparatus includes a first determination unit and an inspection unit. The first determination unit determines whether the printed matter is double-sided or single-sided. When it is determined that the printed matter is double-sided, the inspection unit uses double-sided scanned images to determine the print grade of the printed matter. When it is determined that the printed matter is single-sided, the inspection unit switches between use of single-sided scanned images and use of double-sided scanned images, and evaluates the print grade of the printed matter.

Japanese Unexamined Patent Application Publication No. 2020-120160 describes an inspection apparatus. The inspection apparatus may exclude, from inspection targets, printed matter of a sheet type, which is not suitable for inspection using an automatic inspection function, without a burden such as preregistration on a user. In addition, the inspection apparatus may cope with the case in which pages to be excluded from inspection targets are changed due to change of the sheet type in product printing. The inspection apparatus includes an inspection unit and a determination unit. The inspection unit inspects images by comparing scanned images with correct images. The scanned images are generated by reading images formed on sheets on the basis of a print job. The correct images serve as reference in inspection of images. The determination unit determines, for each page, whether the page is to be inspected or is not to be inspected, from the type of its sheet, on which an image is formed, on the basis of the print settings of a print job. The inspection unit inspects images on pages, which are determined to be inspected by the determination unit, and does not inspect images on pages, which are determined not to be inspected.

Japanese Unexamined Patent Application Publication No. 2020-172028 describes an inspection system which may check the print results of all outputs including pages that are not to be inspected. The inspection system includes an inspection unit, an inspection-target setting unit, an inspection controller, and an inspection report generating unit. The inspection unit compares read images, which are obtained by reading sheets on which images are formed on the basis of a job, with reference images, which are prepared in advance, and inspects the read images. The inspection-target setting unit sets, for a job, inspection target pages that are to be inspected, and non-inspection-target pages that are not to be inspected. The inspection controller controls the inspection unit so that, on the basis of the setting made by the inspection-target setting unit, the inspection-target pages are inspected, and the non-inspection-target pages are not inspected. The inspection report generating unit generates an inspection report including the read images for all pages, including the non-inspection-target pages, in the job.

Assume that, in an inspection system which evaluates the quality of printed matter, only some pages in a job are inspection targets, and the inspection results only for the inspection target pages are displayed. In this case, the page configuration and the page count are different between the actual print outputs and the displayed inspection results. This makes it difficult to specify pages having inspection results indicating OK and pages having inspection results indicating not OK, from the actual print outputs.

SUMMARY

Aspects of non-limiting embodiments of the present disclosure relate to a technique for an inspection system which evaluates the quality of printed matter. In the inspection system, only some pages in a job are inspection targets. The technique enables pages having inspection results indicating OK and pages having inspection results indicating not OK to be easily specified from the actual print outputs.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a printed-matter inspection system including a processor for evaluating quality of printed matter and a display apparatus, wherein, by reading a program for execution, the processor is configured to: for each of a plurality of pages in a job, if the page is an inspection target, compare, for inspection, a scanned image with a reference image, the scanned image being obtained through scanning of printed matter in the page, the reference image being generated by using rasterized data for the page; and, in display of a result of the inspection on the display apparatus, display the scanned image for the page that is an inspection target, and display, for a page that is not an inspection target, a dummy page and information indicating that the page is not an inspection target, the dummy page being a substitute of the scanned image.

BRIEF DESCRIPTION OF THE DRAWINGS

Exemplary embodiment of the present disclosure will be described in detail based on the following figures, wherein:

FIGS. 6B and 6C are diagrams for describing an exemplary screen on a display apparatus according to an exemplary embodiment;

FIG. 8 is a diagram for describing an exemplary screen according to a first modified example;

FIGS. 10B and 10C are diagrams for describing an exemplary screen according to a fourth modified example; and FIGS. 11B and 11C are diagrams for describing an exemplary screen according to a fifth modified example.

DETAILED DESCRIPTION

An exemplary embodiment of the present disclosure will be described below on the basis of the drawings.

Figure 1:
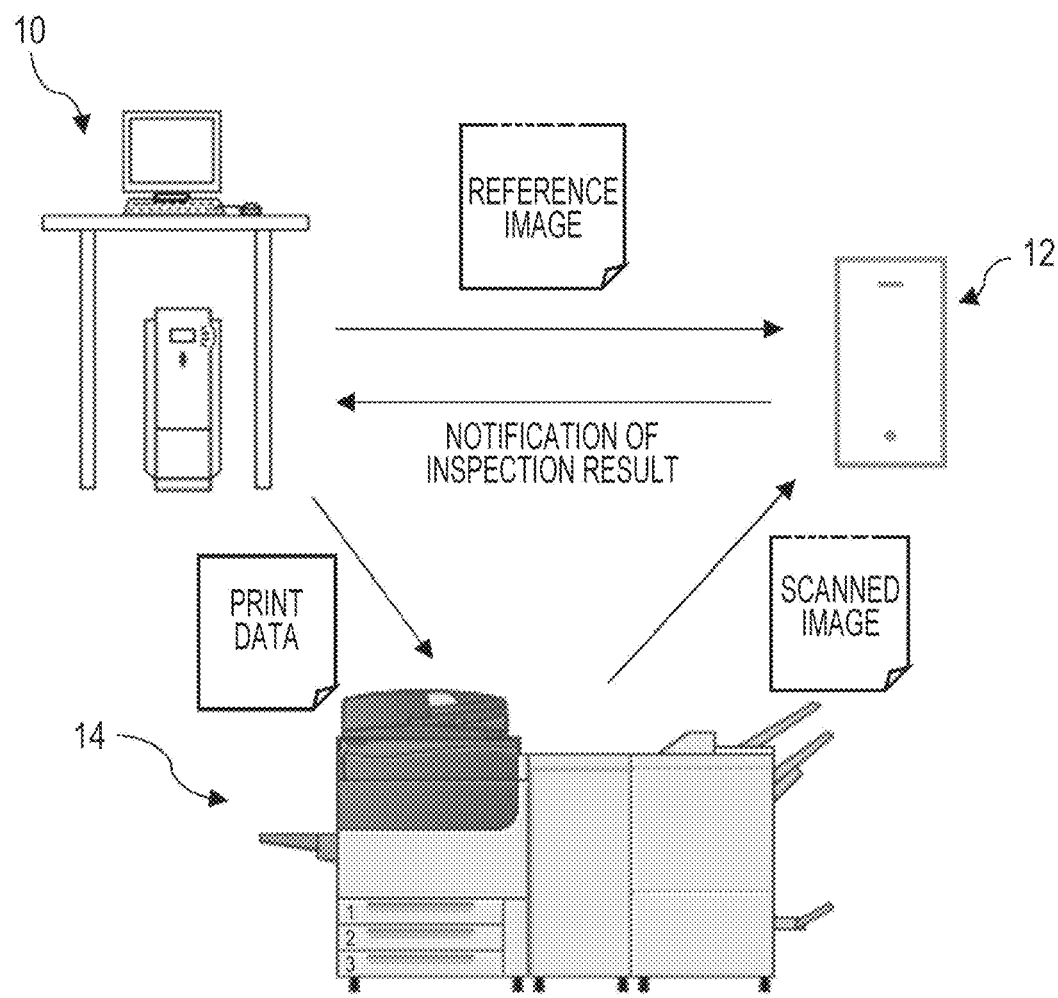
FIG. 1 is a diagram illustrating the system configuration of a printed-matter inspection system according to an exemplary embodiment.

FIG. 1 is a diagram illustrating the system configuration of a printed-matter inspection system according to the present exemplary embodiment. The printed-matter inspection system includes a print server 10, a printed-matter inspection apparatus 12, and a printer 14. The print server 10, the printed-matter inspection apparatus 12, and the printer 14 are connected to each other through a communication line so that data is capable of being received/transmitted. The communication line may be wired/wireless, and may be a public line/a private line. The communication line is, for example, a local area network (LAN), but is not limited to this.

The print server 10 supplies print data of a print job to the printer 14. Other than print data, the print server 10 generates reference image data from the rasterization results of a print job, and supplies the reference image data to the printed-matter inspection apparatus 12. The rasterization, which is known, is a process of performing a drawing process on the basis of data in an intermediate format to generate raster data (image data).

The printer 14 receives print data from the print server 10, and performs printing on sheets on the basis of the print data. The printed matter is discharged to a discharge tray of the printer 14. The printer 14, which includes a built-in scanner, scans the printed matter by using the built-in scanner, generates scanned-image data, and supplies the scanned-image data to the printed-matter inspection apparatus 12.

The configuration of the printer 14, which is known, will be described below simply. The printer 14 prints images on print media such as sheets on the basis of a job (print job) obtained from the print server 10. A print job is the process unit of a print operation requested in a single print instruction.

The printer 14 includes an accommodation unit, a transport unit, a print unit, a discharge unit, and a controller. The accommodation unit, which accommodates sheets that are to be fed to the print unit, includes accommodation trays on which sheets are loaded.

The transport unit transports, to the print unit, a sheet on the accommodation unit. The transport unit includes, for example, a feeding roller for feeding a sheet from the accommodation unit, and multiple transport roller pairs disposed along the transport path from the accommodation unit to the print unit.

The print unit prints an image on a sheet. The print unit prints an image on a sheet, for example, by using an electrophotographic system. That is, the print unit prints an image on a sheet through the processes of charging, exposure to light, development, transfer, and fixing. In addition, the print unit may transport a sheet after the sheet is reversed, and may print images on both sides of the sheet.

The discharge unit is a part onto which a printed sheet is discharged. The discharge unit is formed, for example, of multiple sites disposed vertically. A sheet is discharged onto a site specified in a print job.

The controller controls operations of the units of the printer 14. In the exemplary embodiment, the controller controls operations of the built-in scanner in the following manner: for pages, which are set as inspection targets, among all pages in a job, the operation of the built-in scanner is turned on, and the printed matter, which is obtained through printing using the print unit, is scanned to generate scanned-image data; for pages, which are not set as inspection targets, among all pages in a job, the operation of the built-in scanner is turned off, and scanned-image data is not generated. The controller obtains information about whether to be inspected, from a user terminal, which is operated by a user, or the print server 10. The controller may obtain the information from the printed-matter inspection apparatus 12.

The printed-matter inspection apparatus 12 obtains reference image data from the print server 10 and scanned-image data from the printer 14. For pages, which are set as inspection targets, among all pages in a print job, the printed-matter inspection apparatus 12 detects print abnormalities by comparing the reference image data with the scanned-image data. For pages, which are not set as inspection targets, among all pages in a print job, the printed-matter inspection apparatus 12 generates dummy image data as appropriate. The printed-matter inspection apparatus 12 informs a user of the inspection results through display on the display apparatus.

Figure 2:
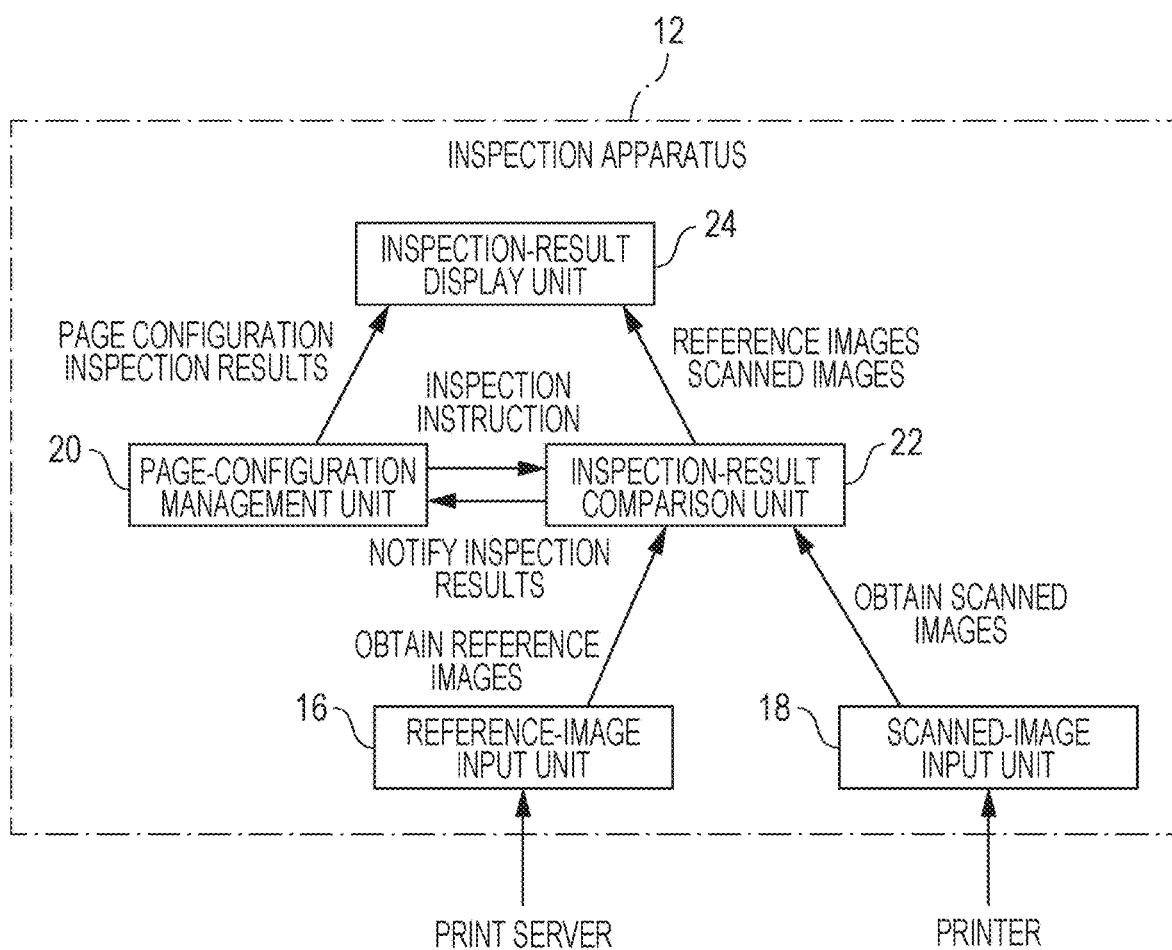
FIG. 2 is a functional block diagram of a printed-matter inspection apparatus according to an exemplary embodiment.

FIG. 2 is a functional block diagram of the printed-matter inspection apparatus 12. The printed-matter inspection apparatus 12 includes, as functional blocks, a reference-image input unit 16, a scanned-image input unit 18, a page-configuration management unit 20, an inspection-result comparison unit 22, and an inspection-result display unit 24.

The reference-image input unit 16 receives reference image data generated by the print server 10. Alternatively, the reference-image input unit 16 may use job data from the print server 10, that is, the rasterization results of a job, to generate reference image data. The reference image data may be generated by either one of the print server 10 and the printed-matter inspection apparatus 12.

The scanned-image input unit 18 receives scanned-image data obtained through scanning using the built-in scanner of the printer 14.

The page-configuration management unit 20 manages information about the pages in a job, information, for each page, about whether the page is an inspection target, and the inspection results of inspection target pages.

The inspection-result comparison unit 22 compares the reference image for each page with the scanned image, and determines whether the print result from the printer 14 contains abnormalities. Abnormalities in a print result include a smudge and a printing defect. The inspection-result comparison unit 22 notifies the page-configuration management unit 20 of inspection results, and supplies the inspection-result display unit 24 with the reference image data and the scanned-image data.

The inspection-result display unit 24 receives data from the page-configuration management unit 20, that is, page configuration data and inspection result data. The inspection-result display unit 24 uses these types of data to display inspection results. Specifically, the inspection-result display unit 24 displays the scanned images for the pages, or both the reference images and the scanned images on the basis of the page configuration data of the job. When an inspection result indicates a print abnormality, an area, in which the abnormality is detected, in the scanned image is highlighted so that a user may easily recognize the abnormality. Examples of the highlight display include display of an arrow indicating an area in which an abnormality is detected, display of an area, in which an abnormality is detected, in a specific color, and display of an area, in which an abnormality is detected, surrounded by a specific shape or a specific type of line. However, the configuration is not limited to this.

Figure 3:
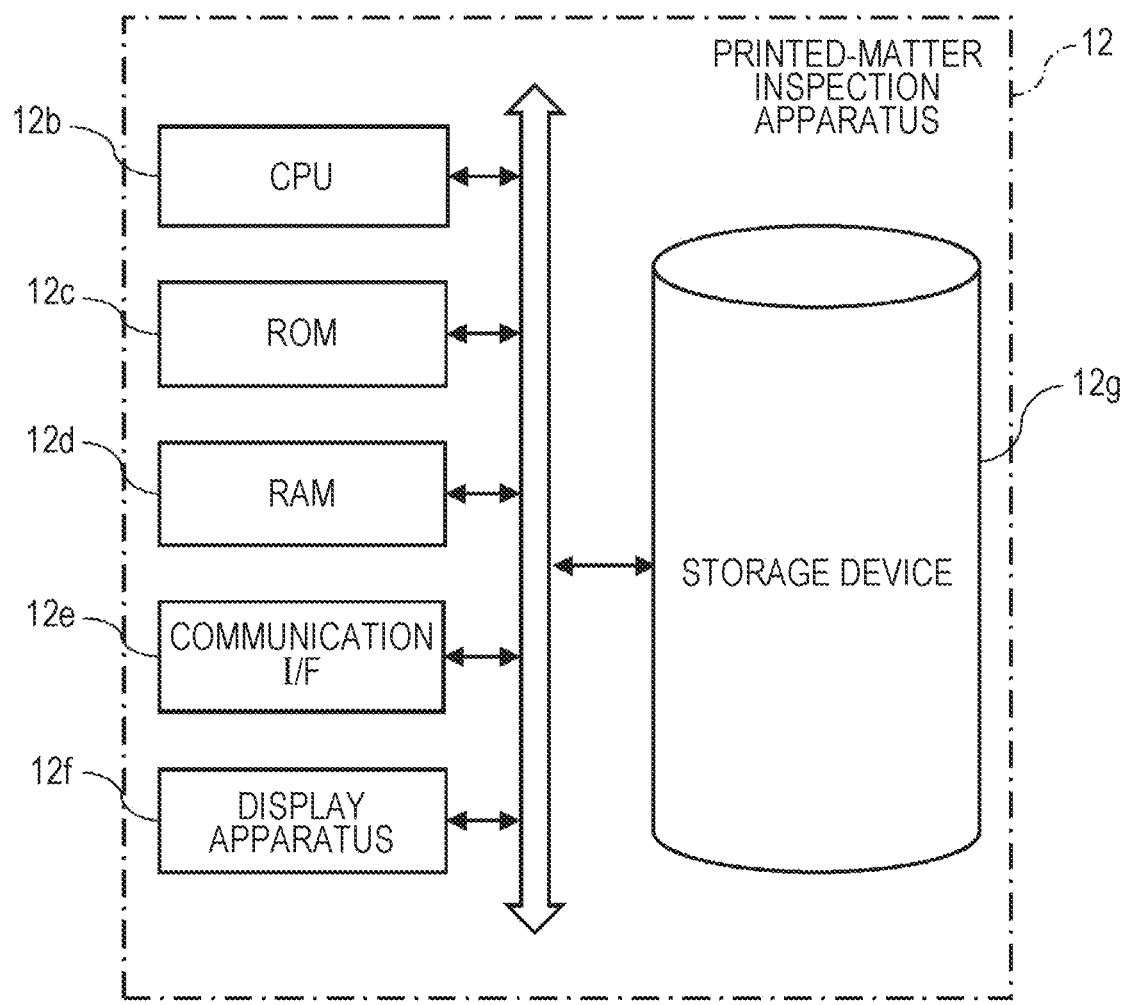
FIG. 3 is a functional block diagram of a printed-matter inspection apparatus according to an exemplary embodiment.

FIG. 3 is a functional block diagram of the printed-matter inspection apparatus 12. The printed-matter inspection apparatus 12, which is formed of at least one computer, includes at least one central processing unit (CPU) 12b, a read-only memory (ROM) 12c, a random access memory (RAM) 12d, a communication interface (I/F) 12e, a display apparatus 12f, and a storage device 12g.

The at least one CPU 12b reads programs stored in the ROM 12c or the storage device 12g, and uses the RAM 12d as a working memory to implement various functions. The CPU 12b implements the page-configuration management unit 20 and the inspection-result comparison unit 22 in FIG. 2.

The communication I/F 12e receives reference image data supplied from the print server 10, and receives scanned-image data supplied from the printer 14. The communication I/F 12e outputs, to the CPU 12b, the received reference image data and scanned-image data.

The display apparatus 12f is formed of a display, such as a cathode-ray tube (CRT), a liquid-crystal display, or an organic light-emitting diode (OLED) display. The display apparatus 12f displays a page configuration and inspection results from the CPU 12b, and displays reference image and scanned image. The display apparatus 12f implements the inspection-result display unit 24 in FIG. 2.

The storage device 12g is formed of a nonvolatile memory, such as a hard disk drive (HDD) or a solid state drive (SSD). The storage device 12g stores various types of image data in addition to programs.

In the embodiment above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiments above, and may be changed.

The printed-matter inspection apparatus 12 according to the present exemplary embodiment compares reference images from the print server 10, that is, reference images which serve as a reference for inspection and which are generated from the rasterization results of a job, with scanned images obtained by using the built-in scanner scanning printed matter printed by the printer 14. The printed-matter inspection apparatus 12 thus checks whether there are abnormalities such as smudges which occur in the printed matter, and displays the inspection results.

However, all pages in a job, which are output by the printer 14, are not necessarily inspection targets. In the following cases, there are pages which are not inspection targets.

(1) The Case in which a User Excludes a Page, which is to be Printed, from Inspection Targets The reason is that erroneous detection may occur in a page using a preprinted sheet. Such a page causes a scanned image in which a preprint image, which is not included in the corresponding reference image, is recorded.

In addition, the reason is that erroneous detection may occur in a page using a sheet such as an embossed sheet, to which a sheet pattern is added intentionally. Such a sheet causes a scanned image in which the sheet pattern is recorded.

In addition, the reason is that a user may intentionally exclude, from inspection targets, a page determined to be unimportant in view of the configuration of a job.

(2) The Case in which a Blank Page, on which Printing is not Performed, is Inserted in View of the Configuration of a Job The reason is that blank pages for sorting, on which printing is not performed, are inserted, for example, to separate copies in a job from each other.

In addition, the reason is that a recovery sheet may be inserted when a paper jam occurs.

In addition, the reason is that, in duplex printing of pages whose number is odd, the backside of the printed matter is a blank sheet.

In these cases, when only inspection results for actually-inspected pages are displayed, the page configuration and the page count are not the same between the printed matter, which is actually output, and the inspection results. Thus, even when a user views the displayed inspection results, the user feels difficult in specifying the inspection target pages in the actual printed matter.

Figures 4A, 4B, 4C:
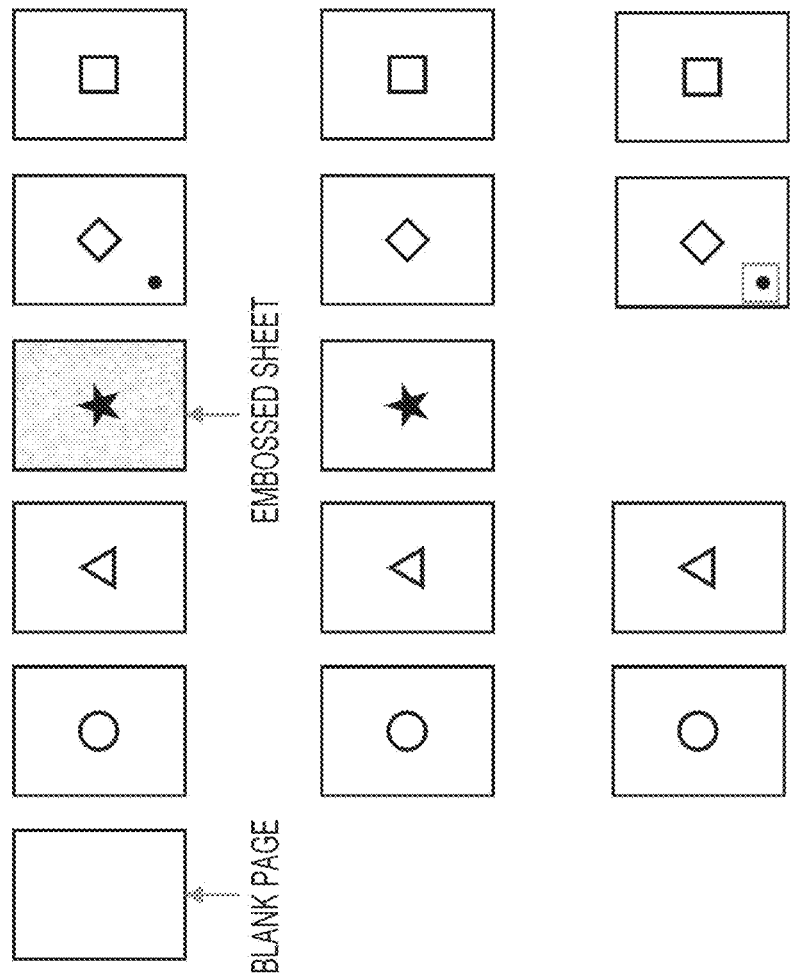
FIGS. 4A to 4C are schematic diagrams illustrating a first example of the relationship between actual printed matter, reference images, and scanned images.

FIGS. 4A to 4C schematically illustrate the case in which only inspection results for actually-inspected pages are displayed. FIG. 4A schematically illustrates actual printed matter which is output from the printer 14. It is assumed that the job includes, for example, six pages in total from page 1 to page 6; page 1 is a blank page on which nothing is printed; page 2 to page 6 are printed pages in which page 4 is an embossed sheet and in which page 5 has a smudge. In FIGS. 4A to 4C, the smudge in page 5 is illustrated by using "." depicted in a lower left portion in page 5.

FIG. 4B schematically illustrates reference images generated from the rasterization results of the job. There is no reference image for page 1; page 2 to page 6 have the respective reference images.

FIG. 4C schematically illustrates only inspection results for actually-inspected pages. Page 1 is a blank page, and page 4 is an embossed sheet. Thus, these pages are excluded from the inspection targets. Page 2, page 3, page 5, and page 6 are actually-inspected pages. The inspection results for these pages are displayed. Therefore, as illustrated in FIG. 4C, the inspection results for the four pages in total are displayed. The inspection results, which indicate that the third page (corresponding to the fifth page in the actual printed matter) from the beginning has a smudge, are displayed. In FIGS. 4A to 4C, a smudge "." in a lower left portion in the third page is surrounded by a square. This indicates that the smudge is present. A user, who views the inspection results, recognizes that there is a smudge on the third page in the four pages. However, from only this information, the user fails to grasp which page in the actual printed matter, which is output from the printer 14, has the smudge.

Accordingly, in consideration of the configuration in which not all the pages in a job, which are output by the printer 14, are inspection targets, and in which there are pages excluded from inspection targets, the printed-matter inspection apparatus 12 according to the present exemplary embodiment has a configuration in which a user may easily specify, in the actual printed matter, pages having abnormalities, even when there are pages excluded from inspection targets. Such a configuration is achieved by displaying inspection results in the same page configuration as that of the actual printed matter.

Figures 5A, 5B, 5C:
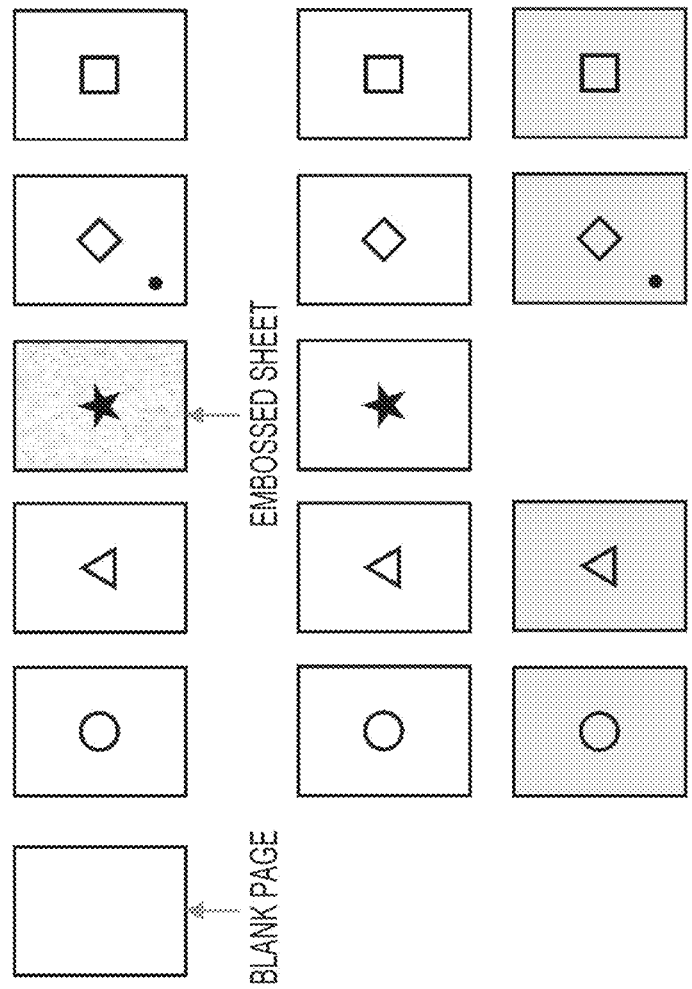
FIGS. 5A to 5C are schematic diagrams illustrating a second example of the relationship between actual printed matter, reference images, and scanned images.

FIGS. 5A to 5C schematically illustrate actual printed matter, reference images, and scanned images according to the present exemplary embodiment. FIG. 5A illustrates actual printed matter. FIG. 5B illustrates reference images. FIG. 5C illustrates scanned images. These are substantially the same as the printed matter, the reference images, the scanned images illustrated in FIGS. 4A to 4C.

That is, as illustrated in FIG. 5A, the actual printed matter has six pages in total from the first page to the sixth page, and the first page is a blank page. Since the first page is a blank page, as illustrated in FIG. 5B, there is no reference image corresponding to the first page, that is, no reference image generated from the rasterization result of the job. In addition, since the first page is a blank page, the first page is not set as an inspection target. As illustrated in FIG. 5C, there is no scanned image corresponding to the first page.

The second page of the actual printed matter is a printed page. As illustrated in FIG. 5B, there is a reference image corresponding to the second page. As illustrated in FIG. 5C, there is a scanned image corresponding to the second page.

The third page of the actual printed matter is a printed page. As illustrated in FIG. 5B, there is a reference image corresponding to the third page. As illustrated in FIG. 5C, there is a scanned image corresponding to the third page.

The fourth page of the actual printed matter is obtained through printing on an embossed sheet. As illustrated in FIG. 5B, there is a reference image corresponding to the fourth page. In contrast, the fourth page, which is obtained through printing on an embossed sheet, is not set as an inspection target in consideration that erroneous detection may occur because the pattern of the embossed sheet is recorded in a scanned image. The fourth page is not scanned by the built-in scanner of the printer 14. As illustrated in FIG. 5C, there is no scanned image corresponding to the fourth page.

The fifth page of the actual printed matter is a printed page. As illustrated in FIG. 5B, there is a reference image corresponding to the fifth page. As illustrated in FIG. 5C, there is a scanned image corresponding to the fifth page. It is assumed that the fifth page has a smudge, as illustrated by using "." in a lower left portion.

The sixth page of the actual printed matter is a printed page. As illustrated in FIG. 5B, there is a reference image corresponding to the sixth page. As illustrated in FIG. 5C, there is a scanned image corresponding to the sixth page.

In this event, the inspection-result display unit 24 of the printed-matter inspection apparatus 12 displays the inspection results in a manner as described below.

Since the first page is a blank page, and has neither a reference image nor a scanned image, a dummy image is displayed as the reference image, and a dummy image is also displayed as the scanned image. In addition, the first page is not set as an inspection target, and the first page has not been inspected actually. Thus, a graphic representation (icon), indicating that the page is not an inspection target, is displayed on a dummy image. The dummy images and the icon, which indicates that the page is not an inspection target, are generated by the page-configuration management unit 20 on the basis of the fact that the first page is not an inspection target, and are supplied to the inspection-result display unit 24.

Since the second page is an inspection target page, and has both a reference image and a scanned image, the reference image and the scanned image are displayed side by side so that the correspondence between the reference image and the scanned image is recognized. Since the second page has no detected abnormalities, the second page is not highlighted. The highlight display indicates an abnormality.

Since the third page is an inspection target page, and has both a reference image and a scanned image, the reference image and the scanned image are displayed side by side so that the correspondence between the reference image and the scanned image is recognized. Since the third page has no detected abnormalities, the third page is not highlighted. The highlight display indicates an abnormality.

Since the fourth page, which is obtained through printing on an embossed sheet, has the rasterization result of the job, the fourth page has a reference image using the rasterization result. Since the fourth page is not an inspection target, the fourth page has no scanned image. Accordingly, the reference image is displayed, and the reference image is also displayed as a substitute of the scanned image. The reference image and the reference image as the scanned image are displayed side by side so that the correspondence between them is recognized. Although the reference image is displayed instead of the actual scanned image, an icon, which indicates that the page is not an inspection target, is displayed on the reference image as a substitute of the scanned image.

Since the fifth page is an inspection target page, and has both a reference image and a scanned image, the reference image and the scanned image are displayed side by side so that the correspondence between the reference image and the scanned image is recognized. Since the fifth page has a detected abnormality, the area of the detected abnormality is highlighted.

Since the sixth page is an inspection target page and has both a reference image and a scanned image, the reference image and the scanned image are displayed side by side so that the correspondence between the reference image and the scanned image is recognized. Since the sixth page has no detected abnormalities, the sixth page is not highlighted. The highlight display indicates an abnormality.

FIGS. 6B and 6C illustrate an exemplary inspection result screen displayed on the display apparatus 12*f* of the printed-matter inspection apparatus 12. Corresponding to FIGS. 5B and 5C, FIG. 6B illustrates reference images, and FIG. 6C illustrates scanned images. The reference images and the scanned images are displayed side by side from the first page to the sixth page so that the correspondence between the reference images and the scanned images is recognized.

For the first page (in FIGS. 6B and 6C, displayed as page 1), dummy images are displayed as a reference image and a scanned image. In FIGS. 6B and 6C, since page 1 is a blank page, the dummy images are blank sheets. An icon 30, which indicates that the page is not an inspection target, is displayed on the dummy image as the scanned image.

The second page, the third page, and the sixth page are inspection targets, and have no detected abnormalities. Thus, a reference image and a scanned image for each page are displayed side by side as they are.

The fourth page is not an inspection target, and has a reference image and no scanned image. Thus, the reference image and the reference image as a substitute as the scanned image are displayed side by side so that the correspondence between them is recognized. The reference image as a substitute of the scanned image functions as a dummy image for the scanned image. An icon 30, which indicates that the page is not an inspection target, is displayed on the dummy image for the scanned image.

The fifth page is an inspection target, and has a detected abnormality. Thus, the reference image and the scanned image are displayed side by side, and an area, in which the abnormality is detected, of the scanned image is highlighted. In FIG. 6C, the area for the detected abnormality is highlighted by surrounding the area by using a rectangular area 32.

A user, who views the screen in FIGS. 6B and 6C, may easily grasp the correspondence between the actual printed matter and the inspection results. That is, a user, who views the icons 30, may immediately grasp the following facts: the first page and the fourth page are not set as inspection targets; the second page, the third page, and the sixth page have no print abnormalities; the fifth page has an abnormality.

In FIGS. 6B and 6C, the first to sixth pages are displayed vertically. As a matter of course, the first to sixth pages may be displayed horizontally. In FIGS. 6B and 6C, the reference images and the scanned images are displayed side by side. Alternatively, the reference images and the scanned images may be disposed at their certain positions, and may be associated with each other, for example, by using any type of line, such as a dashed line or an arrow.

Figure 7:
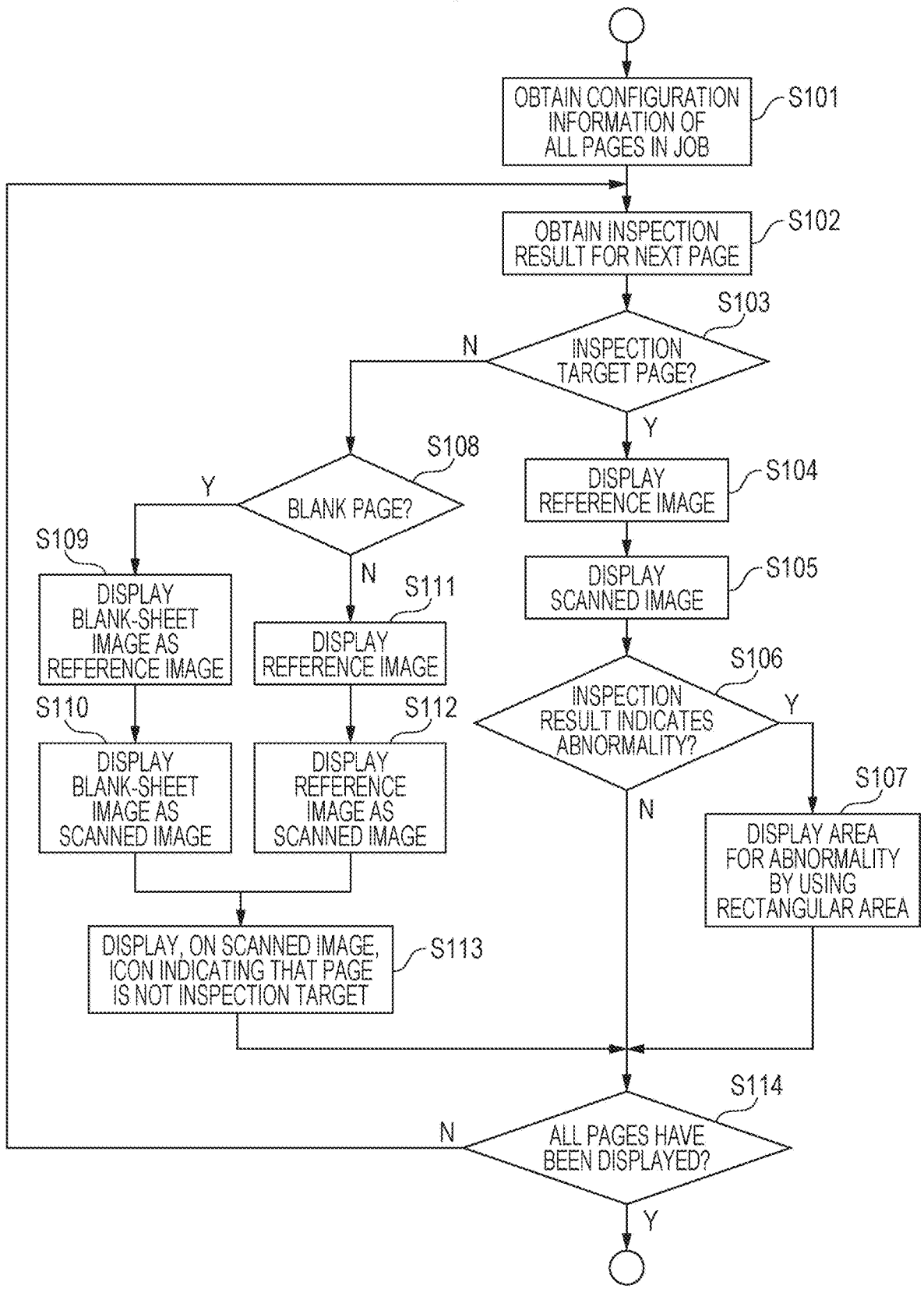
FIG. 7 is a flowchart of a process according to an exemplary embodiment.

FIG. 7 is a flowchart of the process according to the present exemplary embodiment. The process is implemented by the CPU 12b of the printed-matter inspection apparatus 12 reading programs for execution.

The CPU 12b obtains, from the print server 10, configuration information of all pages in a job (S101). Specifically, the CPU 12b obtains rasterized data for each page in the job, information about, for each page, whether the page is a blank page, and information about, for each page, whether the page is an inspection target.

A page to be processed is set sequentially from the first page of all pages in the job, and the inspection result for the next page is obtained (S102). If the page to be processed is the first page of all the pages, and if the inspection result for the first page has not been obtained, the inspection result for the first page is obtained. When the corresponding inspection result is not present, null data is set.

It is determined whether the page to be processed is an inspection target page (S103). If the page to be processed is an inspection target page, that is, if a user sets the page as an inspection target (YES in S103), the page has both a reference image, which is generated from the rasterization result, and a scanned image, which is obtained through scanning using the built-in scanner of the printer 14. Thus, the reference image is displayed (S104), and the scanned image is displayed on the side of the reference image so that the correspondence between them is recognized (S105).

It is determined whether the inspection result for the page, which is to be processed, indicates an abnormality (not OK) (S106). If the inspection result indicates no abnormalities (NO in S106), it is determined whether all pages in the job have been displayed (S114). If all the pages have not been displayed (NO in S114), the process proceeds to S102, and the inspection result for the next page is obtained. If the inspection result indicates an abnormality (YES in S106), an area for the detected abnormality is highlighted by surrounding the area by using a rectangular area (S107). After that, the process proceeds to S114.

In contrast, if the page to be processed is not an inspection target page, that is, if a user does not set the page as an inspection target (NO in S103), it is determined whether the page to be processed is a blank page (S108). Whether the page is a blank page may be determined by determining whether the page has a rasterization result. If the page is a blank page (YES in S108), the page has neither a reference image nor a scanned image. Thus, a blank-sheet image is displayed as a dummy image for the reference image (S109). Similarly, a blank-sheet image is displayed as a dummy image for the scanned image on the side of the dummy image for the reference image so that the correspondence between them is recognized (S110).

If the page is not a blank page (NO in S108), the page has a rasterization result. Thus, a reference image generated from the rasterization result is displayed (S111). The reference image is also displayed as a dummy image for the scanned image on the side of the displayed reference image so that the correspondence between them is recognized (S112).

In each of S110 and S112, an icon, which indicates that the page is not an inspection target, is displayed on the dummy image for the scanned image (S113). After that, the process proceeds to S114.

The process will be described below specifically by using the schematic diagrams in FIGS. 5A to 5C.

When the page to be processed is the first page, which is a blank page and is not an inspection target page, null data is obtained as the inspection result in S102; the determination result in S103 is NO; the determination result in S108 is YES; blank-sheet images are displayed as dummy images for the reference image and the scanned image in S109 and S110. In S113, an icon 30 is displayed on the dummy image for the scanned image.

When the page to be processed is either the second page or the third page, the inspection result for the page is obtained in S102; the determination result in S103 is YES; the reference image and the scanned image are displayed in S104 and S105. The determination result in S106 is NO; the determination result in S114 is NO. Then, the process proceeds to S102.

When the page to be processed is the fourth page, null data is obtained as the inspection result in S102; the determination result in S103 is NO; the determination result in S108 is NO; the reference image is displayed in S111; a dummy image, which is the reference image, is displayed as the scanned image in S112. In S113, an icon 30 is displayed on the dummy image for the scanned image.

When the page to be processed is the fifth page, the determination result in S103 is YES; the determination result in S106 is YES; a rectangular area 32 is displayed in the area, for the detected abnormality, on the scanned image in S107.

When the page to be processed is the sixth page, the determination result in S103 is YES; the determination result in S106 is NO; the determination result in S114 is YES. Then, the process ends.

Thus, when the page to be processed is an inspection target, the reference image and the scanned image are displayed as they are. When the page to be processed is not an inspection target, the page has no scanned image. Thus, a dummy image is displayed as a substitute of the scanned image, and an icon, which indicates that the page is not an inspection target, is displayed so that a user may easily recognize the correspondence between the actual printed matter and the inspection result.

The exemplary embodiment of the present disclosure is described above. The present disclosure is not limited to this, and various modifications may be made. Modified examples will be described below.

First Modified Example

As illustrated in FIGS. 6B and 6C, the exemplary embodiment has a configuration in which, for each of all pages in a job, the reference image and the scanned image are displayed side by side. Alternatively, the reference images for the pages may not be displayed, and only scanned images may be displayed.

FIG. 8 illustrates an exemplary screen on the display apparatus 12f according to a first modified example. Only scanned images for the pages are displayed. Even in this case, for the first page and the fourth page, which are not inspection target pages, dummy images are displayed as substitutes of the scanned images. Thus, a user may easily recognize that the fifth page has an abnormality.

Second Modified Example

As illustrated in FIGS. 6B and 6C, the exemplary embodiment has a configuration in which, for the fourth page which is not an inspection target page, a dummy image, which is the reference image, is displayed as a substitute of the scanned image on the side of the reference image. Alternatively, to skip the process of generating a reference image, a dummy image, which is a blank sheet, may be displayed as in the first page.

Figures 9B, 9C:
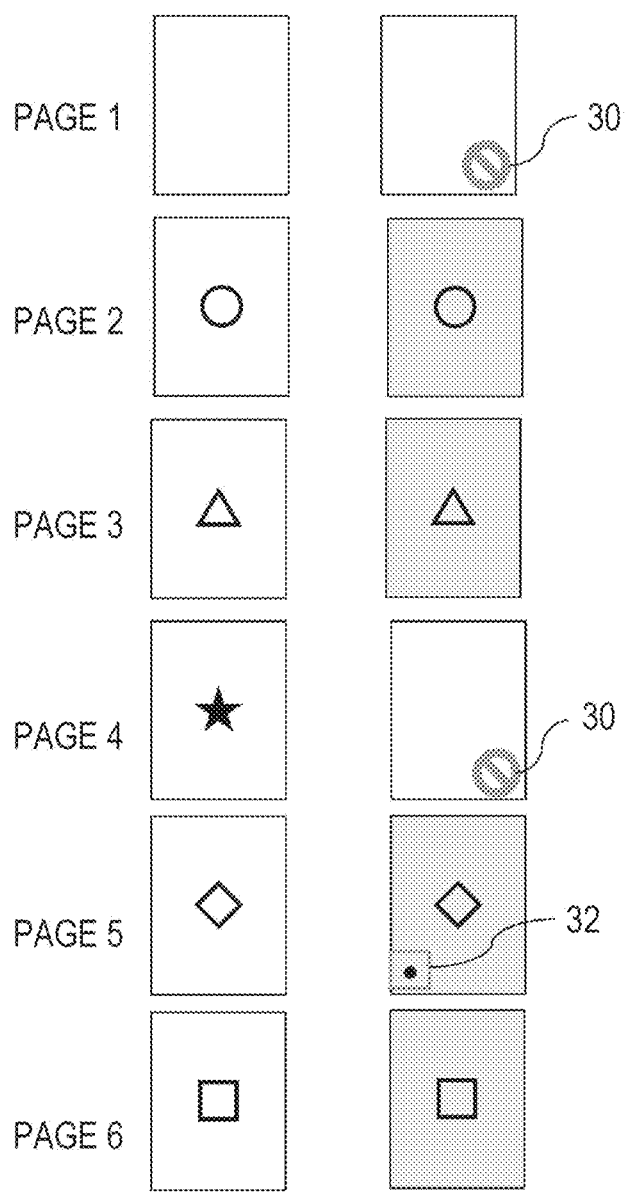
FIGS. 9B and 9C are diagrams for describing an exemplary screen according to a second modified example.

FIGS. 9B and 9C illustrate an exemplary screen on the display apparatus 12f according to a second modified example. The difference from FIGS. 6B and 6C is that, for the fourth page, a dummy image, which indicates a blank sheet, is displayed as the scanned image.

In this case, the reference image is different from the scanned image. Due to an icon 30 displayed on the scanned image, a user recognizes that the fourth page is not an inspection target, prohibiting the user's erroneous recognition.

Third Modified Example

As illustrated in FIGS. 6B and 6C, the exemplary embodiment has a configuration in which, when the first page is a blank page, dummy images, which indicate blank sheets, for the reference image and the scanned image are displayed side by side. However, a sheet inserted as a blank page may be actually a colored sheet so as to be conspicuous as a sheet for sorting. Accordingly, the attributes of a paper feed tray, from which the blank page is inserted, are obtained from the print server 10 or the printer 14. The color of sheets in the paper feed tray is obtained, and is reflected to the dummy image. Thus, the color of the dummy image may be the same as that of the sheet, enabling display of the inspection results to resemble the actual printed matter.

Fourth Modified Example

As illustrated in FIGS. 6B and 6C, the exemplary embodiment has a configuration in which, when the first page is a blank page, dummy images, which indicate blank sheets, for the reference image and the scanned image are displayed side by side. However, the sheet inserted as a blank page may be actually a preprinted sheet, which is printed in advance by a printer different from the printer 14, so as to be conspicuous as a sheet for sorting. Accordingly, image data of the preprinted sheet is obtained from the print server 10, and is reflected to the dummy image, enabling display of the inspection results to resemble the actual printed matter.

FIGS. 10B and 10C illustrate an exemplary screen on the display apparatus 12f according to a fourth modified example. The difference from FIGS. 6B and 6C is that, for the reference image and the scanned image for the first page, dummy images having a preprint image data are displayed.

Even in this case, due to an icon 30 displayed on the scanned image, a user recognizes that the first page is not an inspection target, prohibiting the user's erroneous recognition.

Fifth Modified Example

In the exemplary embodiment, when a dummy image is generated for display, the dummy image may be displayed in a specific display format indicating that the image is a dummy image. For example, a dummy image is displayed in gray.

FIGS. 11B and 11C illustrate an exemplary screen on the display apparatus 12f according to a fifth modified example. The reference image and the scanned image for the first page and the scanned image for the fourth page are dummy images. These images are displayed in gray, which indicates that the images are dummy images.

Sixth Modified Example

In the exemplary embodiment, when a dummy image is to be generated for display, a user may select, as appropriate, a display format indicating that the image is a dummy image. For example, a user operates the printed-matter inspection apparatus 12 to select, for setting, a display format of a dummy image from a display menu. The display menu is displayed, for example, with the following options:
 "blank page";
 "sheet color";
 "preprint image";
 "display in gray";
 "others".

In addition, a user may select, as appropriate, the shape of an icon 30 which indicates that the page is not an inspection target, or the format in which the area for a detected abnormality is highlighted.

Seventh Modified Example

The exemplary embodiment has a configuration in which, among all pages in a job, blank pages and embossed sheets are not set as inspection targets. Alternatively, in addition to these, specific pages may not be set as inspection targets. In addition to blank pages and embossed sheets, for example, pages, which are known in advance as causing some abnormality that is not regarded as a problem, may not be set as inspection targets. For such a page, a dummy image is displayed as a substitute of the scanned image, and an icon 30, which indicates that the page is not an inspection target, is displayed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A printed-matter inspection system comprising:
a processor for evaluating quality of printed matter; and
a display apparatus,
wherein, by reading a program for execution, the processor is configured to:
for each of a plurality of pages in a job, if the page is an inspection target, compare, for inspection, a scanned image with a reference image, the scanned image being obtained through scanning of printed matter in the page, the reference image being generated by using rasterized data for the page; and,
in display of a result of the inspection on the display apparatus, display the scanned image for the page that is an inspection target, and display, for a page that is not an inspection target, a dummy page and information indicating that the page is not an inspection target, the dummy page being a substitute of the scanned image.

2. The printed-matter inspection system according to claim 1,
wherein the dummy page includes an image generated by using rasterized data for the page that is not an inspection target.

3. The printed-matter inspection system according to claim 1,
wherein the dummy page is a blank page.

4. The printed-matter inspection system according to claim 1,
wherein the dummy page is a page in a color identical to a color of a sheet for the page that is not an inspection target.

5. The printed-matter inspection system according to claim 1,
wherein the dummy page includes a preprint image.

6. The printed-matter inspection system according to claim 1,
wherein the processor is configured to, for the page that is an inspection target, display the reference image and the scanned image as a pair, and, for the page that is not an inspection target, display, as a pair, the reference image and the dummy page serving as the scanned image.

7. The printed-matter inspection system according to claim 2,
wherein the processor is configured to, for the page that is an inspection target, display the reference image and the scanned image as a pair, and, for the page that is not an inspection target, display, as a pair, the reference image and the dummy page serving as the scanned image.

8. The printed-matter inspection system according to claim 3,
wherein the processor is configured to, for the page that is an inspection target, display the reference image and the scanned image as a pair, and, for the page that is not an inspection target, display, as a pair, the reference image and the dummy page serving as the scanned image.

9. The printed-matter inspection system according to claim 4,
wherein the processor is configured to, for the page that is an inspection target, display the reference image and the scanned image as a pair, and, for the page that is not an inspection target, display, as a pair, the reference image and the dummy page serving as the scanned image.

10. The printed-matter inspection system according to claim 5,
wherein the processor is configured to, for the page that is an inspection target, display the reference image and the scanned image as a pair, and, for the page that is not an inspection target, display, as a pair, the reference image and the dummy page serving as the scanned image.

11. The printed-matter inspection system according to claim 1,
wherein the processor is configured to:
display a graphic representation as the information indicating that the page is not an inspection target.

12. The printed-matter inspection system according to claim 2,
wherein the processor is configured to:
display a graphic representation as the information indicating that the page is not an inspection target.

13. The printed-matter inspection system according to claim 3,
wherein the processor is configured to:
display a graphic representation as the information indicating that the page is not an inspection target.

14. The printed-matter inspection system according to claim 4,
wherein the processor is configured to:
display a graphic representation as the information indicating that the page is not an inspection target.

15. The printed-matter inspection system according to claim 5,
wherein the processor is configured to:
display a graphic representation as the information indicating that the page is not an inspection target.

16. The printed-matter inspection system according to claim 6,
wherein the processor is configured to:
display a graphic representation as the information indicating that the page is not an inspection target.

17. The printed-matter inspection system according to claim 1,
wherein the processor is configured to:
display the dummy page in gray serving as the information indicating that the page is not an inspection target.

18. The printed-matter inspection system according to claim 1,
wherein the processor is further configured to:
receive an operation instruction from a user; and
change a display format of the dummy page in response to the operation instruction.

19. A non-transitory computer readable medium storing a program causing a computer to execute a process comprising:
for each of a plurality of pages in a job, if the page is an inspection target, comparing, for inspection, a scanned image with a reference image, the scanned image being obtained through scanning of printed matter in the page, the reference image being generated by using rasterized data for the page; and, in display of a result of the inspection on a display apparatus, displaying the scanned image for the page that is an inspection target, and displaying, for a page that is not an inspection target, a dummy page and information indicating that the page is not an inspection target, the dummy page being a substitute of the scanned image.

20. A printed-matter inspection method comprising:

for each of a plurality of pages in a job, if the page is an inspection target, comparing, for inspection, a scanned image with a reference image, the scanned image being obtained through scanning of printed matter in the page, the reference image being generated by using rasterized data for the page; and, in display of a result of the inspection on a display apparatus, displaying the scanned image for the page that is an inspection target, and displaying, for a page that is not an inspection target, a dummy page and information indicating that the page is not an inspection target, the dummy page being a substitute of the scanned image.

* * * * *